United States Patent Office 3,686,202
Patented Aug. 22, 1972

3,686,202
TRIAZOLYL-COUMARINS
Rudolf Kirchmayr, Binningen, Basel-Land, and Jean Rody, Basel, Switzerland, assignors to Ciba-Geigy Corporation, Ardsley, N.Y.
No Drawing. Filed July 8, 1969, Ser. No. 840,037
Int. Cl. C07d 99/04; C09k 1/02
U.S. Cl. 260—308 A
7 Claims

ABSTRACT OF THE DISCLOSURE

Coumarins substituted in 3-position and containing 1,2,3-triazolyl-(4) in 7-position are useful optical brighteners. A specific embodiment is 2-phenyl-4-[3-phenyl-coumarinyl-(7)]-5-methyl-v-triazole.

---

The present invention concerns new coumarins, substituted in 3-position and containing in 7-position a 1,2,3-triazolyl-(4)-radical, processes for the production thereof, their use for the optical brightening of organic material, as well as the material brightened by application thereof and, as an industrial product, textile agents containing these coumarins.

More particularly, the present invention relates to 1,2,3-triazolyl-(4)-coumarins of the formula

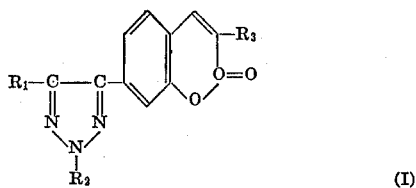

(I)

wherein $R_1$ is lower alkyl, phenyl, or phenyl substituted by lower alkyl, lower alkoxy, fluoro, chloro, or trifluoromethyl;
$R_2$ is lower alkyl or a benzenoid aromatic radical which can be substituted by non-chromogenic groups;
$R_3$ is phenyl or phenyl substituted by lower alkyl or lower alkoxy, fluorine, chlorine, or trifluoromethyl.

The substituents of $R_1$, $R_2$, and $R_3$ can be defined as follows:

$R_1$ denotes alkyl of from 1 to 4 carbon atoms in methyl or ethyl, iso- or n-propyl or butyl, phenyl or phenyl, optionally substituted by lower alkyl or lower alkoxy, both of which can have 1 to 4 carbon atoms, fluoro chloro or trifluoromethyl.

$R_2$ is alkyl of from 1 to 4 carbon atoms preferably methyl or ethyl, iso- or n-propyl or butyl, or it can represent an optionally non-chromogenically substituted benzenoid aromatic radical (Hans Beyer, Lehrbuch der organ. Chemie (Textbook of Organic Chemistry), 1963, 10th edition, S. Hirel Verlag (publishers), Leipzig), such as the phenyl, 1- or 2-naphthyl or biphenyl. This benzenoid aromatic radical can be substituted by nonchromogenic groups, e.g. by lower alkyl having 1 to 4 carbon atoms such as methyl, ethyl, propyl, isopropyl, n-butyl- or isobutyl; it can be substituted by fluorine, especially chlorine or trifluoromethyl, alkoxy such as methoxy, ethoxy, propoxy, butoxy, O-acyl or —NH-acyl, whereby with acyl is meant in particular acetyl, propionyl, butyryl or benzoyl, by alkylene or alkylene ether bound at adjacent positions of the benzene ring, such as tetramethylene or methylenedioxy. It can also be substituted by sulphonic acid groups, sulphamide groups and by sulphamide groups substituted at the nitrogen atom, e.g. optionally substituted N-alkyl and N-dialkyl-sulphamoyl groups such as N-methyl, N-ethyl, N-butyl, N-hydroxyethyl, N-methoxyethyl, N-ethoxyethyl, N - dimethylaminoethyl, N - dimethylaminopropyl, N-diethylaminoethylsulphamoyl groups and N-dimethyl and N-diethylsulphamoyl groups and morpholinosulphonyl groups; it can be substituted by, e.g. alkylsulphonyl groups such as methylsulphonyl, ethylsulphonyl, butylsulphonyl, phenylsulphonyl groups, carboxyl groups; it can be substituted by, e.g. the sulphonic acid phenyl esters, carbalkoxy groups such as carboxylic acid methyl ester, carboxylic acid ethyl ester, carboxylic acid butyl ester, carboxylic acid benzyl ester or carboxylic acid cyclohexyl ester groups; it can be substituted by, e.g. carboxylic acid amide groups and carboxylic acid amide groups substituted at the nitrogen atom such as carboxylic acid ethylamide, carboxylic acid diethylamide, carboxylic acid monoethanolamide, carboxylic acid - (3 - methoxypropylamide)-, carboxylic acid morpholide, carboxylic acid piperidide or carboxylic acid-(3-dimethylamino)-propylamide groups; it can also be substituted by further substituted alkyl groups such as

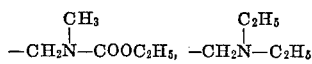

$R_3$ represents in particular phenyl or phenyl, optionally substituted by lower alkyl or lower alkoxy, both of which can have 1 to 4 carbon atoms, by fluorine, chlorine or trifluoromethyl.

In particularly preferred compounds of the Formula I, $R_1$ represents lower alkyl, $R_2$ the phenyl group, an alkylphenyl group or a fluoro- or chlorophenyl group and $R_3$ represents phenyl, chlorophenyl, lower alkyl phenyl.

3-phenyl coumarins, substituted in 7-position by a 4,5-areno-v-triazolyl-(2)-radical, have already been suggested as brighteners for organic material. These brighteners, however, emit a fluorescent light having an undesired greenish tint, or they possess too strong an inherent yellow colour. In the case of higher dosages they thus impart to the brightened organic material a greenish appearance, in consequence of which there is a severe impairment of the visual perception of whiteness. Furthermore, on polyamide and polyester fibres, which are so important for the textile industry, these products have comparatively little fastness to light and, with longish exposure to light of the therewith brightened material, they clearly assume a yellowish discolouration.

3-phenyl coumarins, containing in the 3-phenyl radical a 4,5-areno-v-triazolyl-(2)-group in p-position, have also been already suggested as brighteners for textiles. These products have, however, only a weak and greenish fluorescence, are unsuitable for the obtaining of a brilliant brightening effect and have so far not attained any industrial importance.

The likewise previously known 3-phenyl coumarins, containing in 7-position a v-triazolyl-(1)-group, also produce inadequate whiteness effects.

In contrast to the known compounds, the instantly claimed compounds of Formula I have little inherent colour, i.e. negligible light absorption in the visible part of the spectrum, and they exhibit in daylight an intensive bluish-violet to violet fluorescence.

The compounds of the Formula I have a very good fastness to chlorine and are appreciably more soluble in organic solvents than the comparable compounds known from the state of technology. The good solubility of the 7-[2,5-disubstituted - 1,2,3 - triazolyl-(4)]-3-arylcoumarins in organic solvents renders possible an especially advantageous cleansing of the optical brighteners after being commercially produced, i.e. the optical brighteners can be produced in a particularly pure form. The new coumarin compounds of the Formula I, which are colourless to yellowish crystalline substances, impart to yellowed, organic material, when contained in small amounts and incorporated into or applied to the material in the usual methods, a purely white appearance in daylight and are, therefore, valuable optical brighteners. In comparison with known comparable optical brighteners of the coumarin series, they are distinguished by a more neutral whiteness effect and a consequently better evening shade, by very good temperature stability on application, as well as by very good stability to chemical bleaching agents such as chlorites, perborates and percarbonates.

They are therefore suitable as optical brighteners for substrates of the most varied kinds. Thus the 7-[2,5-disubstituted-1,2,3-triazolyl-(4)]-3-arylcoumarins produce good white effects on cellulose and polyamide materials such as cotton, viscose silk, staple fibre, nylon, polyamides based on caprolactam, wool and silk, the polyamides preferably being brightened from an acid aqueous bath or in the spinning solution, and the cellulose substrates from an acid to alkaline aqueous bath. Products having a cationic character are particularly suitable for the brightening of textile materials from polymeric and copolymeric acrylonitrile. Such triazolyl coumarins, according to the invention, which contain no ionogenic groups are, however, especially valuable. These products are suitable for the optical brightening of high molecular, hydrophobic, organic material, particularly for the brightening of synthetic organic polyplasts, i.e. plastics obtainable by polymerisation, e.g. polycondensation or polyaddition, such as polyolefins, e.g. polyethylene or polypropylene, also polyvinyl chloride, chiefly however, polyesters, particularly polyesters of aromatic polycarboxylic acids with polyvalent alcohols such as polyterephthalic acid glycol esters, synthetic polyamides such as nylon 6 and nylon 66, but also cellulose esters such as cellulose acetates.

The optical brightening of the high molecular, hydrophobic, organic material is achieved, for example, by incorporating into this material small amounts of optical brighteners according to the invention, preferably 0.001 to 1% relative to the material to be brightened, optionally together with other substances, such as softeners, stabilisers or pigments. The brighteners can be worked into the synthetic materials, e.g. when dissolved in softening agents such as dioctylphthalate, or together with stabilisers such as dibutyl tin dilaurate or sodium pentaoctyl tripolyphosphate, or together with pigments such as, e.g. titanium dioxide. Depending on the type of material to be brightened, the brightener can also be dissolved in the monomers before polymerisation, in the polymer mixture, or together with the polymer in a solvent. The thus preliminarily treated material is then processed into the desired ultimate from using processes known per se, such as calendering, pressing extending, brushing, casting and, in particular, spinning and drawing. The brighteners can also be worked into finishing agents, e.g. in dressings for textile fibres such as polyvinyl alcohol, or in resins or in resin precondensates such as, e.g. methylol compounds of ethylene urea, which are used for the treatment of textiles.

Preferably however, high molecular organic material in the form of fibres is brightened. These fibre materials are advantageously brightened by using an aqueous dispersion of 7-[2,5-disubstituted-1,2,3-triazolyl-(4)-]-3-aryl coumarin of the Formula I, according to the invention. The brightener dispersion preferably contains 0.005-0.5% of v-triazole according to the invention, relative to the fibre material. The dispersion can moreover contain auxiliaries such as dispersing agents, e.g. condensation products of fatty alcohols or alkyl phenols having 10 to 18 carbon atoms with 15 to 25 mols of ethylene oxide, or condensation products of alkylmonoamines or polyamines having 16 to 18 carbon atoms with at least 10 mols of ethylene oxide, organic acids such as formic acid, oxalic acid or acetic acid, washing agents, swelling agents such as di- or trichlorobenzenes, wetting agents such as sulphosuccinic acid alkyl esters, bleaching agents such as sodium chlorite, peroxides or hydrosulphites as well as, optionally, brighteners of other classes such as, e.g. stilbene derivatives having affinity to cellulose.

The brightening of the fibre material with the aqueous brightening dispersion is performed either by the exhaustion process at temperatures of, preferably, 30 to 150° C., or by the pad dyeing process. In the latter case, the material is impregnated with, e.g. a 0.2-0.5% brightener dispersion and a finished, e.g. by a dry or moist heat treatment, e.g. by steaming at 2 atm. or by a brief, dry heating after drying, to 180-220° whereby, optionally, the fabric is simultaneously thermofixed. Finally, the thus treated fibre material is rinsed and dried.

High molecular organic material, optically brightened according to the invention, especially the synthetic fibre material brightened using the exhaustion process, possesses a pleasing, pure white, bluish-violet to bluish fluorescent appearance.

The 7-[2,5 - disubstituted - 1,2,3 - triazolyl-(4)-]-3-aryl coumarins of the Formula I, according to the invention, are obtained by condensation from the oxime hydrazones of the Formula VI or IX,

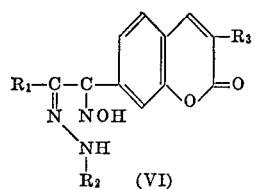 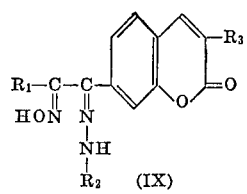

wherein $R_1$, $R_2$ and $R_3$ have the meaning given in Formula I, with the splitting off of water by means of protonic acids or acid anhydrides, optionally whilst heating.

Examples of ring-closing protonic acids are, in particular, the hydrohalic acids. Examples of effective acid anhydrides are the inorganic anhydrides: phosphorus pentoxide and sulphur trioxide, the mixed inorganic-organic anhydrides such as the alkanoyl and aroyl, alkylsulphonyl and arylsulphonyl halides, e.g. acetyl chloride, benzoyl chloride, toluenesulphochloride, as well as the purely organic anhydries such as acetoanhydride, benzoic acid anhydride, also the mixed anhydride of formic acid and acetic acid.

The condensation of the oxime hydrazones to the compounds of the general Formula I, according to the invention, can be performed in the presence of organic solvents which are inert under the reaction conditions. Suitable as such are high-boiling hydrocarbons and halogenated hydrocarbons, e.g. chlorobenzene, dichlorobenzenes, xylenes; but inert, slightly or more strongly basic solvents may be used, e.g. dimethylformamide, dimethylacetamide or pyridine, picolines, quinolines. Depending on the substituents of the oxime hydrazones, cyclisation can be effected by simply allowing the reaction mixture to stand or by heating it. Suitable as the reaction temperature are temperatures between room temperature and 250° C., preferably 200° C. Sometimes the presence of basic catalysts such as anhydrous alkali or alkaline-earth salts of organic acids, e.g. sodium or potassium acetate, produces favourable results with regard to yields and purity of the end products. The progress of the ring-closure reaction can be best followed by thin layer chromatography. The occurrence of O-acylated intermediate products when mixed inorganic/organic or purely organic acid anhydrides are used, is of insignificant importance with regard to the course of the reaction.

Triazolyl coumarins, according to the invention, can be produced from the oxime hydrazones of the Formula VI or IX also by oxidation into the corresponding triazole oxides of the Formula X or XI

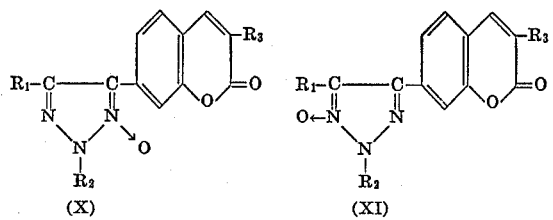

and reduction of the latter to the corresponding triazolyl compounds.

The oxidative ring closure can be produced by the action of the most varied oxidising agents, whereby the use of oxidation-resistant solvents is recommended. In acid, e.g. acetic acid solution, bichromate or hydrogen peroxide can be used as oxidising agents. In basic solvents such as pyridine or pyridine/water mixtures, potassium ferricyanide or chlorine in alkali solution are, for example, suitable. The generally applicable and therefore preferred process is the oxidation with copper-(II)-sulphate in pyridine/water. It is not necessary for stoichiometric amounts of copper to be thereby used, because the monovalent copper forming during the reaction can be continually converted again during the reaction—by blowing in air or oxygen—into the bivalent stage.

For the reduction of the triazole oxides to the triazoles, according to known methods, the reduction with base metals and acids, such as zinc dust in acetic acid or acetic acid/water mixtures, is advantageously applied. It is also possible to use for the reduction, however, salts of reducing acids of sulphur or phosphorus.

The oxime hydrazones of the Formula VI, required for the described methods of production of the triazolyl coumarins of the Formula I, are obtained from β-ketocarboxylic acid esters, e.g. from the following:

TABLE I acetoacetic acid ethyl ester
propionylacetic acid ethyl ester
butyrylacetic acid ethyl ester
valeroylacetic acid ethyl ester
p-methylbenzoylacetic acid ethyl ester
p-methoxybenzoylacetic acid ethyl ester
benzoylacetic acid ethyl ester
p-chlorobenzoylacetic acid ethyl ester
m-chlorobenzoylacetic acid ethyl ester
m-methylbenzoylacetic acid ethyl ester
p-butoxybenzoylacetic acid ethyl ester by saponification to give the corresponding carboxylic acids and reaction of the latter with nitrous acid to obtain the oximinoketones of the Formula II,

  (II)

These oximinoketones are reacted with diazonium salts of the General Formula III

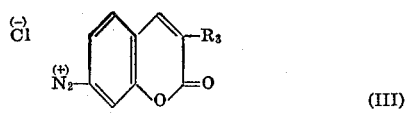  (III)

to give the compounds of the Formula IV,

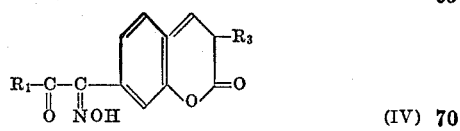  (IV)

from which are obtained with hydrazines of the General Formula V,

 (V)

the already described oxime hydrazones of the Formula VI, which are required as starting material for production of the triazolyl coumarins according to the invention.

Examples of suitable diazonium salts of the Formula III are the diazonium salts of the following amino coumarins:

TABLE II 3-phenyl-7-amino coumarin
3-(3-methylphenyl)-7-amino-coumarin
3-(4-methylphenyl)-7-amino coumarin
3-(3,4-dimethylphenyl)-7-amino coumarin
3-(3-chlorophenyl)-7-amino coumarin
3-(4-chlorophenyl)-7-amino coumarin
3-(2,4-dichlorophenyl)-7-amino coumarin
3-(4-fluorophenyl)-7-amino coumarin
3-(3-methoxyphenyl)-7-amino coumarin To produce oxime hydrazones of the Formula VI according to the described methods, hydrazines of the Formula V are used, and in particular the following:

TABLE III methyl hydrazine
ethyl hydrazine
propyl hydrazine
butyl hydrazine
phenyl hydrazine
p-methylphenyl hydrazine
p-butylphenyl hydrazine
p-methoxyphenyl hydrazine
o-methoxyphenyl hydrazine
m-chlorophenyl hydrazine
p-chlorophenyl hydrazine
3,4-dichlorophenyl hydrazine
p-carboxyphenyl hydrazine
p-carbethoxyphenyl hydrazine
o-acetyloxyphenyl hydrazine
p-acetyloxyphenyl hydrazine
o-benzoyloxyphenyl hydrazine
p-benzoyloxyphenyl hydrazine
2-naphthyl hydrazine
1-naphthyl hydrazine
p-methylsulphonylphenyl hydrazine
p-phenylsulphonylphenyl hydrazine
p-phenylphenyl hydrazine
p-phenyl hydrazine sulphonic acid
p-dimethylsulphamoylphenyl hydrazine
p-dibutylsulphamoylphenyl hydrazine
p-phenyl hydrazine sulphonic acid phenyl ester
p-acetylaminophenyl hydrazine
p-butyrylaminophenyl hydrazine The oxime hydrazones of the Formula IX,

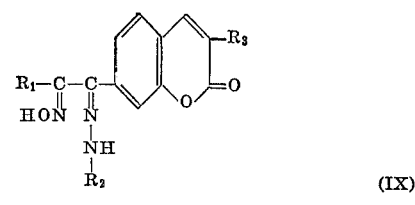  (IX)

which are likewise used for production of the triazolyl coumarins of the Formula I, are obtained from the already described β-ketocarboxylic acid esters of the Table I by way of the β-keto-α-arylhydrazones of the Formula VII.

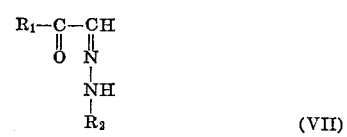  (VII)

by reaction with diazonium salts of the Formula III, Table II, to compounds of the Formula VIII,

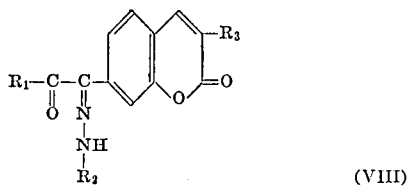

which are reacted with hydroxylamine.

$R_1$, $R_2$ and $R_3$ in the Formulae II–XI have the meaning given in Formula I.

Further details are contained in the following examples, whereby the temperatures are given in degrees centigrade.

EXAMPLE 1

(1.1) 2-phenyl-4-[3-phenylcoumarinyl-(7)]-5-methyl-v-triazole

To a solution of 130.0 g. of acetoacetic acid ethyl ester in 300 ml. of water and 100 ml. of concentrated sodium hydroxide solution are added, after 24 hours standing at room temperature, 70.0 g. of sodium nitrite in 300 ml. of water. This solution is cooled to 0–5° and, while stirring and at this temperature, 421.0 g. of 2% sulphuric acid are added dropwise within 2 hours. With the evolution of $CO_2$ is formed the oximinoacetone, which in part precipitates in the form of colourless crystals. The reaction mixture is stirred for a further 2 hours at 5° and an addition is then made of solutions of 25 g. of copper sulphate pentahydrate in 125 ml. of water and of 50 g. of sodium sulphite in 400 ml. of water. A dark-green solution is obtained, into which is added dropwise, within 4 hours at 5–10°, a suspension of the diazonium salt obtained by diazotising from 240 g. of 3-phenyl-7-amino courmarin. There is an appreciable evolution of nitrogen, whereby the 2-methyl-1-[3-phenyl coumarinyl-(7)-glyoxal-1-monoxime precipitates in the form of yellowish-brown crystals. These are filtered with suction, washed with water and dried.

61.4 g. of the thus obtained 2-methyl-1-[3-phenyl-coumarinyl-(7)-glyoxal-1-monoxime are dissolved at 60–70° in 200 ml. of pyridine. Into this solution are added dropwise, within one hour, 21.6 g. of phenyl hydrazine and the reaction mixture is then stirred for 1½ hours at 60–70°. A solution of 112 g. of copper sulphate pentahydrate in 200 ml. of water is added dropwise within 1 hour. The reaction mixture is stirred for a further 2 hours at 80–90° and then cooled. The 2-phenyl-4-[3-phenyl-coumarinyl-(7)-]-5-methyl-v-triazole - 3 - oxide thereby precipitates. The reaction product is filtered with suction, washed with hot methanol and dried.

60.0 g. of 2-phenyl-4-[3-phenylcoumarinyl-(7) - ] - 5-methyl-v-triazole-3-oxide are dissolved hot at 90–100° in 700 ml. of glacial acetic acid. To this solution are added 22 g. of zinc dust and then, within 1 hour, 15 ml. of concentrated hydrochloric acid are added dropwise. The reaction mixture is subsequently stirred for a further 2 hours at 90–100°, filtered hot and the filtrate diluted with some water. The 2-phenyl-4-[3-phenylcoumarinyl-(7)-]-5-methyl-v-triazole precipitates in the form of fine needles which, after recrystallising twice from toluene, melt at 205°.

If, instead of phenyl hydrazine, the following hydrazine compounds are reacted with 2-methyl-1-[3-phenylcoumarinyl-(7)-)-glyoxal-1-monoxime, with the procedure being otherwise as described above, the following v-triazoles are obtained:

From o-benzoyloxyphenyl hydrazine:

(1.2) 2-(2'-methoxyphenyl)-4-[3-phenylcoumarinyl-(7)-]-5-methyl-v-triazole, M.P. 205°.

From o-benzoyloxyphenyl hydrazine:

(1.3) 2-(2'-benzoyloxyphenyl)-4-[3-phenylcoumarinyl-(7)-]-5-methyl-v-triazole, M.P. 204°.

From p-ethylsulphonylphenyl hydrazine:

(1.4) 2-(4'-methylsulphonylphenyl)-4-[3-phenyl-coumarinyl-(7)-]-5-methyl-v-triazole, M.P. 268°.

From p-methoxyphenyl hydrazine:

(1.5) 2-(4'-methoxyphenyl)-4-[3-phenylcoumarinyl-(7)-]-5-methyl-v-triazole, M.P. 211°.

From p-carboxyphenyl hydrazine:

(1.6) 2-(4'-carboxyphenyl)-4-[3-phenylcoumarinyl-(7)-]-5-methyl-v-triazole, M.P. 300°.

From 3,4-dichlorophenyl hydrazine:

(1.7) 2-(3',4'-dichlorophenyl)-4-[3-phenylcoumarinyl-(7)-]-5-methyl-v-triazole, M.P. 270°.

From p-chlorophenyl hydrazine:

(1.8) 2-(4'-chlorophenyl)-4-[3-phenylcoumarinyl-(7)-]-5-methyl-v-triazole, M.P. 250°.

From m-chlorophenyl hydrazine:

(1.9) 2-(3'-chlorophenyl)-4-[3-phenylcoumarinyl-(7)-]-5-methyl-v-triazole, M.P. 246°.

From m-methylphenyl hydrazine:

(1.10) 2-(3'-methylphenyl)-4-[3-phenylcoumarinyl-(7)-]-5-methyl-v-triazole, M.P. 193°.

From β-naphthyl hydrazine:

(1.11) 2-(2'-naphthyl)-4-[3-phenylcoumarinyl-(7)-]-5-methyl-v-triazole, M.P. 222°.

From p-phenoxyphenyl hydrazine:

(1.12) 2-(4'-phenoxyphenyl)-4-[3-phenylcoumarinyl-(7)-]-5-methyl-v-triazole, M.P. 184°.

From o-chlorophenyl hydrazine:

(1.13) 2-(2'-chlorophenyl)-4-[3-phenylcoumarinyl-(7)-]-5-methyl-v-triazole, M.P. 211°.

EXAMPLE 2

(2.1) 2-(4'-methylphenyl)-4-[3-phenylcoumarinyl-(7)]-5-methyl-v-triazole

A solution of 286 g. of acetoacetic acid ethyl ester in 100 ml. of water and 250 ml. of concentrated sodium hydroxide solution is acidified, after standing for 24 hours at room temperature, with 600 ml. of glacial acetic acid. Into this solution is added dropwise at 0–5° within 2 hours a diazonium salt solution, which has been produced in the usual manner from 215 g. of p-methylaniline. The reaction mixture is then stirred for 5 hours at 10–20°, the formed crystalline precipitate is filled with suction and washed with methanol and water.

7.5 g. of copper sulphate pentahydrate and 15 g. of sodium sulphite, dissolved in 100 ml. of water, are added to the solution of 57.6 g. of the thus obtained 1-(4'-methylphenyl)-hydrazono-2-methylglyoxal in 1500 ml. of glacial acetic acid. A suspension of the diazonium salt, obtained by the diazotising of 72.0 g. of 3-phenyl-7-amino coumarin, is then added in portions at 10°. The reaction mixture is stirred for 12 hours at room temperature and the precipitated 2-methyl-1-[3-phenylcoumarinyl-(7)]-glyoxal-1-(4'-methylphenyl)-hydrazone then filtered with suction.

40.0 g. of 2-methyl-1-[3-phenylcoumarinyl-(7)]-glyoxal-1-(4'-methylphenyl)-hydrazone are dissolved with 14.0 g. of hydroxylamine hydrochloride and 27.2 g. of sodium acetate in 200 ml. of pyridine at 90–100° and stirred for 12 hours at this temperature. To the solution of the thus obtained oxime hydrazone at 90° is added dropwise a solution of 50.0 g. of copper sulphate pentahydrate in 50 ml. of water, with stirring proceeding for a further 2 hours at 90°. During cooling, the 2-(4'-methylphenyl)-

4-[3-phenylcoumarinyl-(7)-]-5-methyl-triazole - 1 - oxide precipitates in crystalline form.

10.0 g. of the thus obtained traizole oxide with 10.0 g. of zinc dust in 80 ml. of glacial acetic acid are refluxed for 8 hours. The reaction mixture is filtered hot and in the filtrate, whist cooling, the 2-(4'-methylphenyl)-4-]-3-phenylcoumarinyl-(7) - 5 - methyl-v-triazole crystallises, M.P. 244° after being recrystallised twice with chlorobenzene.

EXAMPLE 3

(3.1) 2,5-diphenyl-4-[3-phenylcoumarinyl-(7)-]-v-triazole 49.3 g. of 1-phenylhydrazono-2-phenylglyoxal are dissolved at room temperature in 2 litres of glacial acetic acid. To this solution are added 5 g. of copper sulphate pentahydrate and 10 g. of sodium sulphite, dissolved in 100 ml. of water. An addition is made to the reaction mixture cooled to 10°, within 1 hour and in portions, of a suspension of the diazonium salt obtained from 48.0 g. of 3-phenyl-7-amino coumarin. The reaction mixture is stirred for 24 hours at room temperature. The precipitated 2-phenyl-1-[3-phenylcoumarinyl-(7)]-glyoxal - 1 - phenyl hydrazone is then filtered off with suction, the filtrate washed with methanol and water and recrystallised from methyl cellosolve. The thus obtained 2-phenyl-1-[3-phenylcoumarinyl-(7)]-glyoxal-1-phenyl hydrazone melts at 216°.

22.2 g. of 2-phenyl-1-[3-phenylcoumarinyl-(7)]-glyoxal-1-phenyl hydrazone with 7.0 g. of hydroxylamine hydrochloride and 13.6 g. of sodium acetate are dissolved at 90–100° in 200 ml. of pyridine and stirred for 12 hours at this temperature. To the solution of the thus formed oxime hydrazone is added dropwise at 90° a solution of 25 g. of copper sulphate pentahydrate in 50 ml. of water, with stirring proceeding for a further hour at 90°. This is followed by cooling, during which the 2,5-diphenyl-4-[3-phenylcoumarinyl-(7)]-v-triazole-1-oxide then precipitates in crystalline form.

10.4 g. of 2,5-diphenyl-4-[3-phenylcoumarinyl-(7)]-v-triazole-1-oxide with 10.0 g. of zinc dust in 300 ml. of glacial acetic acid are refluxed for 8 hours, whereupon the reaction mixture is filtered hot. In the filtrate crystallises during cooling the 2,5-diphenyl-4-[3-phenylcoumarinyl-(7)]-v-triazole, which melts at 228° after being recrystallised twice from chlorobenzene.

From 1 - phenylhydrazono-2-(4'-chlorophenyl)-glyoxal, in the same reaction sequence as described above, are obtained the following:

3.2 2-phenyl-4-[3-phenylcoumarinyl-(7)] - 5 - (4'-chlorophenyl)-v-triazole.

From 1-phenylhydrazono-2-(4'-methylphenyl)-glyoxal:

3.3 2-phenyl-4-[3-phenylcoumarinyl-(7)] - 5 - (4'-methylphenyl)-v-triazole.

From 1-phenylhydrazono - 2 - (4'-methoxyphenyl)-glyoxal:

3.4 2-phenyl - 4 - [3 - phenylcoumarinyl-(7)] - 5 - (4'-methoxyphenyl)-v-triazole.

EXAMPLE 4

0.2 g. of trichlorobenzene are added to 100 ml. of water. A solution is produced of the optical brightener, obtained according to Example 1.1, by dissolving 1 g. thereof in 1000 ml. of ethylene glycol monoethyl ether. 3 ml. of this stock solution are added to the above described aqueous solution. This aqueous solution containing the brightener is heated to 60° and 3 g. of polyester fabric are introduced into the solution. The temperature is raised within 10–15 minutes to 95°–98° and is held there for 1 hour. The fabric is rinsed and dried.

Compared with the untreated starting material, the thus treated fabric has a clearly whiter, more brilliant appearance.

EXAMPLE 5

To 100 ml. of water are added 0.2 g. of sodium chlorite, 0.2 g. of sodium nitrite and 0.2 g. of oxalic acid and 3 ml. of a stock solution of the brightener, produced according to Example 1.2. (The stock solution is prepared by dissolving 1 g. of the brightener, Example 1.2, in 1000 ml. of ethylene glycol monoethyl ether.) To this aqueous solution are additionally added 0.2 g. of a carrier consisting of trichlorobenzene. This solution is heated to 60° and 3 g. of polyester fabric are added to the solution. The temperature is raised within 10–15 minutes to 85° and maintained there for 30 minutes. The temperature is then increased to 98–100° and treatment proceeds for a further 30 minutes at this temperature. The fabric is rinsed and dried.

Compared with the starting material, the thus treated fabric has a clearly whiter and more brilliant appearance.

EXAMPLE 6

To 285 ml. of water are added 0.3 g. of an alkylpolyglycol ether and 0.15 g. of trichlorobenzene. A solution is prepared from the optical brightener, obtained according to Example 1.1, by dissolving 1 g. thereof in 1000 ml. of ethylene glycol monoethyl ether. 15 ml. of this stock solution are added to the above described solution. This aqueous solution containing the brightener is heated to 20–30° and 15 g. of polyester fabric are then introduced into the solution. The temperature is raised within 30 minutes to 100° and maintained there for 30 minutes, after which the temperature is decreased within 15–20 minutes to 60°. The fabric is rinsed and dried.

Compared with the untreated starting material, the thus treated fabric has a clearly whiter and more brilliant appearance.

EXAMPLE 7

0.2 g. of the sodium salt of the dioctylsulphosuccinic acid are added to 100 ml. of water. A 10% mixture milled in sand of the optical brightener, according to Example 1.9, is produced and 3 g. of this mixture are added to the above described aqueous solution. This solution is then used to pad (squeezing effect 50–60%) at 20° a polyester fabric (roller pressure 30 kg./cm.$^2$, speed 3 m./min.). The fabric is dried at ca. 60° and the dried fabric is fixed for 30 seconds at 200°.

Compared with the untreated material, the thus treated fabric has a clearly whiter and more brilliant appearance.

EXAMPLE 8

To 100 ml. of water are added 0.12 ml. of 85% formic acid and 0.06 g. of alkylpolyglycol ether. A solution is prepared of the optical brightener, according to Example 1.9, by dissolving 1 g. thereof in 1000 ml. of ethylene glycol monoethyl ether. 1.5 ml. of this stock solution are added to the above described aqueous solution.

This aqueous solution containing the brightener is heated to 60° and 3 g. of nylon staple fabric are introduced into the solution. The temperature is increased within 10–15 minutes to 90–92° and is maintained there for 30 minutes. The fabric is rinsed and dried.

Compared with the untreated starting material, the thus treated fabric has a clearly whiter and more brilliant appearance.

EXAMPLE 9

100 parts of polypropylene with 0.5 part of titanium dioxide and 0.06 part of 2-(4'-methylphenyl)-4-[3-phenylcoumarinyl-(7)]-5-methyl-v-triazole are homogenised at 200° in a mixer. The melt, under inert gas of 2–3 atm. pressure and at a temperature of 280–300°, is spun through spinning-nozzles by application of known methods. The thus obtained polypropylene fibres are characterised by a high degree of whiteness.

A similar effect is obtained if, in the above example, the stated coumarinyl-v-triazole is replaced by 0.06 part of 2-(3'-methylphenyl)-4-[3-phenylcoumarinyl - (7)]-5-methyl-v-triazole.

EXAMPLE 10

0.06 part of 2-(4'-chlorophenyl)-4-[3-phenylcoumarinyl-(7)]-5-methyl-v-triazole, with a mixture consisting of 67 parts of polyvinyl chloride powder, 33 parts of dioctylphthalate, 2 parts of di-n-butyl-dilauryl-dioxystannate and 0.3 part of sodium pentaoctyl-tripolyphosphate are gelatinised at 160° for 15 minutes on mixing rollers and subsequently extruded in the form of sheet. The thus produced polyvinyl chloride sheet possesses in daylight a violet fluorescence and has a clearly whiter appearance when corresponding sheet which has been produced without addition of this brightener.

EXAMPLE 11

1000 parts of polyester granulate from polyterephthalic acid ethylene glycol are intimately mixed with 0.2 part of 2-(4'-methylphenyl)-4-[3 - (phenylcoumarinyl-(7)]-5-methyl-v-triazole and then spun under nitrogen from an extruder to form threads at a temperature of 260–285° and through a spinning-nozzle in the known manner. The thus obtained polyester threads exhibit a high degree of whiteness with an excellent fastness to light and to washing.

A similar effect is obtained if, in the above example, the stated coumarinyl-v-triazole is replaced by 0.2 part of 2-phenyl-4-[3-phenylcoumarinyl-(7)]-5-methyl - v - triazole or 2-(4'-chlorophenyl)-4-[3 - phenylcoumarinyl-(7)]-5-methyl-v-triazole.

EXAMPLE 12

1000 parts of granulated terylene are mixed with 1 part of finely pulverised 2,5-diphenyl-4-[3-phenylcoumarinyl-(7)] v-triazole for 3 hours in a roller mixer. The granulate is subsequently extruded using a screw extruder with a mixture temperature of 250°, in the form of an endless spiral of 2 mm. diameter, and is then granulated. The thus obtained material possesses, compared with the starting granulate, an improved colour, i.e. a higher degree of whiteness. It can be spun into filaments having a brillant degree of whiteness, using the standard machines.

EXAMPLE 13

In a high-grade steel autoclave, provided with a stirrer, a gas-inlet tube, a vacuum arrangement, a descending condenser, a shut-off nozzle in the base, a charging valve and a heating jacket, 388 g. of benzene-1,4-dicarboxylic acid dimethyl ester, 300 g. of 1,2-ethanediol and 0.4 g. of antimonous oxide are heated to 200° external temperature, while blowing through pure nitrogen. This temperature is maintained for 3 hours, whereby methanol slowly distills off. While excluding air, 0.4 g. of 2-phenyl-4-[3-phenylcoumarinyl - (7)] - 5 - methyl-v-triazole, dissolved in 40 g. of 1,2-ethanediol, are carefully fed into the autoclave after the temperature has been allowed to fall to 190°. After the addition is completed, the temperature is raised within one hour to 285° external temperature, whereby 1,2-ethanediol distills off. The autoclave is then evacuated with the pressure slowly being reduced to 0.2 torr and condensation is completed over 3 hours under these conditions. Thorough stirring is maintained during these operations. The liquid condensation polymer is then extruded by nitrogen pressure through the bottom nozzle. Monofilaments, having a brilliant white appearance, can be produced from the thus obtained polymers.

What is claimed is:

1. A compound of the formula

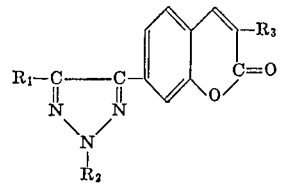

wherein $R_1$ is lower alkyl, phenyl, or phenyl substituted by lower alkyl, lower alkoxy, fluoro, chloro, or trifluoromethyl;

$R_2$ is lower alkyl, phenyl, naphthyl, biphenyl or phenyl substituted by lower alkyl, lower alkoxy, phenoxy, lower alkyl sulfonyl, chlorine, carboxy or benzoyloxy.

$R_3$ is phenyl or phenyl substituted by lower alkyl, lower alkoxy, fluorine, chlorine or trifluoromethyl.

2. A compound as defined in claim 1 wherein $R_1$ is lower alkyl;

$R_2$ is phenyl, alkylphenyl, fluorophenyl, or chlorophenyl, and $R_3$ is phenyl, chlorophenyl, or lower alkyl phenyl.

3. A compound as defined in claim 1 wherein said compound is 2-phenyl-4-[3-phenylcoumarinyl-(7)]-5-methyl-v-triazole.

4. A compound as defined in claim 1 wherein said compound is 2-(4' - methylsulfonylphenyl)-4-[3-phenylcoumarinyl-(7)]-5-methyl-v-triazole.

5. A compound as defined in claim 1 wherein said compound is 2 - (4' - carboxyphenyl)-4-[3 - phenylcoumarinyl-(7)]-5-methyl-v-triazole.

6. A compound as defined in claim 1 wherein said compound is 2-(4' - methylphenyl)-4-[3 - phenyl-coumarinyl-(7)]-5-methyl-v-triazole.

7. A compound as defined in claim 1 wherein said compound is 2,5 - diphenyl-4-[3 - phenylcoumarinyl-(7)]-v-triazole.

References Cited

UNITED STATES PATENTS 3,251,851   5/1966   Schellhammer et al. __ 260—308

FOREIGN PATENTS 478,835   9/1969   Switzerland _____ 260—308
1,113,918  5/1968   Great Britain _____ 260—308

ALTON D. ROLLINS, Primary Examiner

U.S. Cl. X.R.

8—1 W; 252—301.2 W; 260—247.1, 293.58, 342.2 R, 471 R, 473 R, 566 A